(12) United States Patent  
Truesdell

(10) Patent No.: US 11,319,984 B2  
(45) Date of Patent: May 3, 2022

(54) LOCKING SNAP-HOOK FOR USE WITH LINKLESS ATTACHMENT

(71) Applicant: Buckingham Manufacturing Company, Inc., Binghamton, NY (US)

(72) Inventor: Kevin Truesdell, Binghamton, NY (US)

(73) Assignee: Buckingham Manufacturing Company, Inc., Binghamton, NY (US)

( * ) Notice: Subject to any disclaimer, the term of this patent is extended or adjusted under 35 U.S.C. 154(b) by 0 days.

(21) Appl. No.: 16/662,297

(22) Filed: Oct. 24, 2019

(65) Prior Publication Data

US 2020/0132107 A1 Apr. 30, 2020

Related U.S. Application Data

(60) Provisional application No. 62/750,499, filed on Oct. 25, 2018.

(51) Int. Cl.
*F16B 45/02* (2006.01)

(52) U.S. Cl.
CPC .................................. *F16B 45/02* (2013.01)

(58) Field of Classification Search
CPC .... F16B 45/02; Y10T 4/45366; Y10T 4/4534; Y10T 4/45351; Y10T 4/45414
See application file for complete search history.

(56) References Cited

U.S. PATENT DOCUMENTS

| | | | | | |
|---|---|---|---|---|---|
| 437,380 | A | * | 9/1890 | Lundborg | A44C 5/145 24/600.9 |
| 1,709,235 | A | * | 4/1929 | Shaffer | F16B 45/02 294/82.19 |
| 2,357,478 | A | * | 9/1944 | Koch | F16G 11/046 24/600.9 |
| 4,062,092 | A | * | 12/1977 | Tamada | F16B 45/02 24/599.4 |
| 4,179,148 | A | * | 12/1979 | Johnson | B63B 21/08 24/115 G |
| 4,539,732 | A | * | 9/1985 | Wolner | B66C 1/36 24/600.2 |
| 5,579,564 | A | * | 12/1996 | Rullo | F16B 45/02 24/599.4 |
| 5,735,025 | A | * | 4/1998 | Bailey | F16B 45/02 24/600.1 |
| 5,913,479 | A | * | 6/1999 | Westwood, III | F16B 45/02 24/298 |
| 9,255,602 | B2 | * | 2/2016 | Liang | F16B 45/06 |
| 9,382,939 | B1 | | 7/2016 | Rullo et al. | |
| 10,502,249 | B2 | * | 12/2019 | Stoldt | E21B 19/02 |
| 2005/0193533 | A1 | * | 9/2005 | Chang | F16B 45/02 24/601.4 |

(Continued)

*Primary Examiner* — Robert Sandy
*Assistant Examiner* — Rowland Do
(74) *Attorney, Agent, or Firm* — Bond, Schoeneck & King, PLLC; Frederick Price

(57) ABSTRACT

A linkless, locking snap-hook, comprising a body member with a proximal hook, defining a proximal opening facing a first direction, and a distal hook, defining a distal opening facing a second direction. A linkless, locking snap-hook also comprising a locking mechanism which has a keeper, a biasing means, and a locking grip member. The linkless, locking snap-hook is capable of accepting a variety of attachment devices.

6 Claims, 7 Drawing Sheets

(56) References Cited

U.S. PATENT DOCUMENTS

| | | | | |
|---|---|---|---|---|
| 2008/0174130 A1* | 7/2008 | Lin | ........................ | F16B 45/02 |
| | | | | 294/82.2 |
| 2008/0184540 A1* | 8/2008 | Coulombe | .............. | F16B 45/02 |
| | | | | 24/599.1 |
| 2008/0185848 A1* | 8/2008 | Coulombe | .............. | F16B 45/02 |
| | | | | 292/1 |
| 2010/0299893 A1* | 12/2010 | Liang | ...................... | F16B 45/02 |
| | | | | 24/599.5 |
| 2011/0078881 A1* | 4/2011 | Carveth | ................. | F16B 45/02 |
| | | | | 24/599.6 |
| 2012/0042487 A1* | 2/2012 | Yang | ....................... | F16B 45/02 |
| | | | | 24/599.5 |
| 2013/0025095 A1* | 1/2013 | Yang | ....................... | F16B 45/02 |
| | | | | 24/599.5 |
| 2013/0160252 A1* | 6/2013 | Lin | ........................ | F16B 45/02 |
| | | | | 24/601.5 |
| 2014/0110956 A1* | 4/2014 | Lin | .......................... | B66C 1/36 |
| | | | | 294/82.2 |

* cited by examiner

LOCKING SNAP-HOOK FOR USE WITH LINKLESS ATTACHMENT

CROSS REFERENCE TO RELATED APPLICATIONS

This application claims priority to U.S. Provisional Patent Application Ser. No. 62/750,499 filed on Oct. 25, 2018, entitled Linkless Attachment Arrangement for a Locking Snap-Hook or the like which is incorporated herein by reference in their respective entireties.

FIELD OF THE INVENTION

The present invention pertains to snap-hooks or similar apparatus used for securing and suspending workers and, more particularly, to a linkless apparatus for use therewith allowing direct connection of different attachment mechanisms without need of an intermediate attachment link.

BACKGROUND

Conventional locking snap-hooks and similar devices are well known and are used in myriad service industries. Such devices are widely used by workers in at least the electric utility, arborist, and construction industries.

Most snap-hooks or similar devices in use today feature locking mechanisms. Locking apparatuses have innumerable design variations. Each design, however, has as its main objective providing a snap-hook that is easily snapped into place, but which will not prematurely or unintentionally release. Although most snap-hooks work reasonably well, some hook mechanisms work better than others.

Further, snap-hook devices currently in use have an eye loop at an end of a body member for threading through and attaching various devices, ropes, or webbings. Other snap-hook devices have the eye loop positioned on the distal end of the device body and facing a first direction, and an open loop portion positioned on the proximal end of the device body and facing the same first direction. See, e.g., U.S. Pat. No. 9,382,939 at FIGS. 3-4. Such a design may not provide a device with sufficient desired/optimal strength for certain particular uses, or allow for attachment of a desired/optimal number of accessories and provide for a sufficient range of movement with attached accessories.

Description of the Related Art Section Disclaimer: To the extent that specific patents/publications/products are discussed above in this Background Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Background Section and/or throughout the application, the descriptions/disclosures of which are all hereby incorporated by reference into this document in their respective entirety(ies).

SUMMARY

It is therefore a principal object and advantage of the present invention to provide a snap-hook device that eliminates one or more of the problems/issues discussed above. Benefits of the improved snap-hook device design include 3,600 lbs. rated gate, and an improved eye shape and/or location (with respect to an open loop portion) to allow for attachment of more accessories and provide a better range of movement with attached accessories.

In particular, the present disclosure is directed to an improved snap-hook device, which can include a body member, an eye loop positioned on a distal end of the body member and facing a first direction, and an open loop portion positioned on the proximal end of the body member and facing a second direction. The snap-hook device can also include a locking mechanism, which can function similarly in some ways as shown and described in U.S. Pat. No. 9,382,939, although can have some different configurations and functional effects in view of the improved "opposing direction" loop design described and illustrated herein (as should be understood and appreciated by a person of ordinary skill in the art in conjunction with a review of this disclosure).

BRIEF DESCRIPTION OF THE DRAWINGS

The embodied invention will be more fully understood and appreciated by reading the following detailed description in conjunction with the accompanying drawings, in which.

Figure 1:
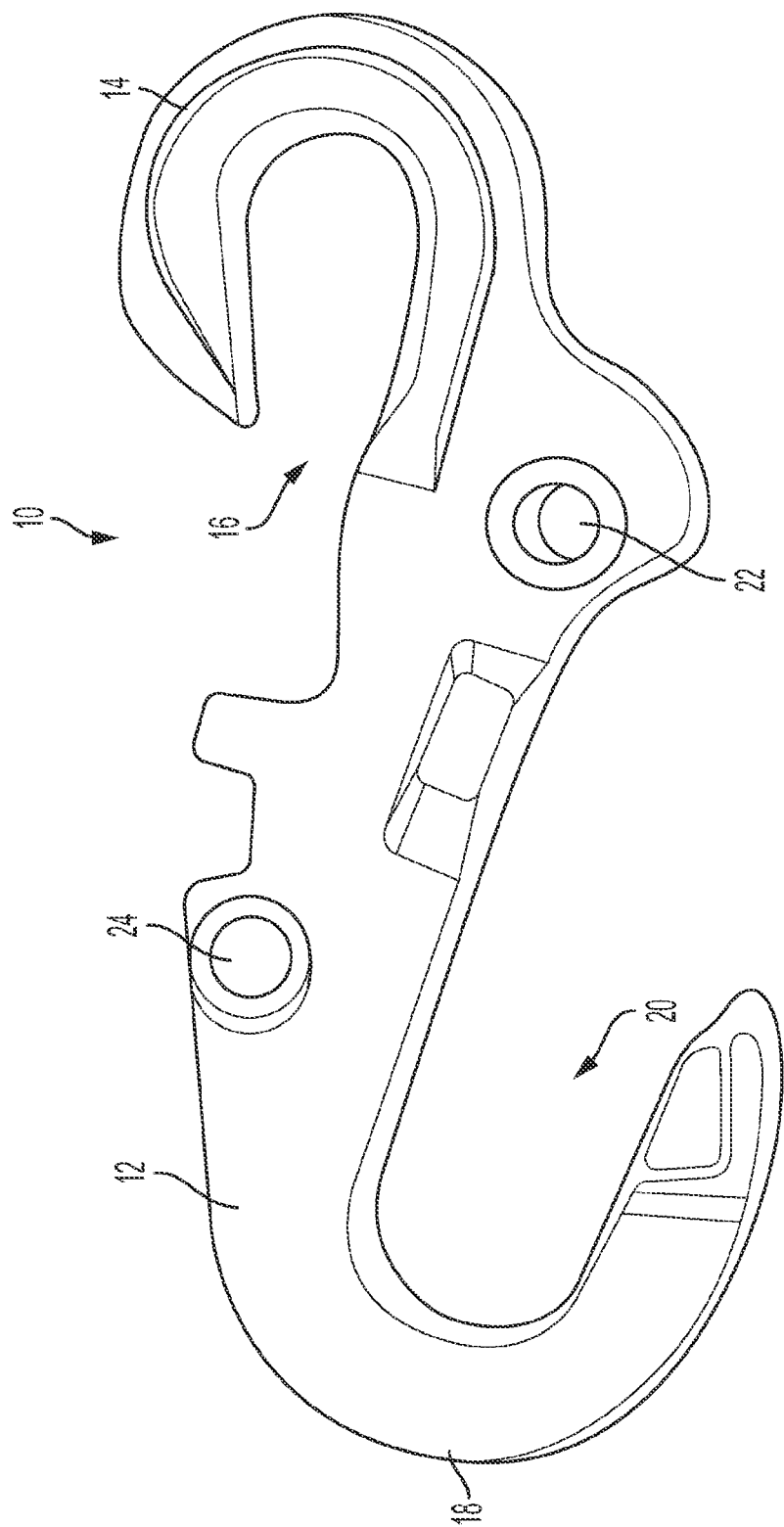
FIG. 1 is a perspective view of an example of a snap-hook absent a locking mechanism.

Where applicable, like reference characters designate identical or corresponding components and units throughout the several views, which are not to scale unless otherwise indicated. Moreover, the embodiments disclosed herein may include elements that appear in one or more of the several views or in combinations of the several views.

DETAILED DESCRIPTION OF EMBODIMENTS

The present snap-hook is a locking snap-hook for workers in service industries. The locking snap-hook apparatus has dual-actuated, simultaneously active release grips. It's unique body member allows for selective attachment of different attachment devices without the need for an intermediate linking mechanism.

Referring first to FIG. 1, there is shown an example of a snap-hook, generally at reference numeral 10, in this example snap-hook 10 is absent a locking mechanism. Snap-hook 10 comprises a sigmoidal body member 12 which comprises a proximal hook 14 and a distal hook 18.

Proximal hook 14 defines a proximal opening 16 and distal hook 18 defines a distal opening 20. The proximal opening 16 is positioned such that it opens on the opposite side of the body member 12 relative to the distal opening 20. The middle portion of the body member 12 can also define two holes 22,24.

The opposing position of distal opening 20 and proximal opening 16 of body member 12 allows for attachment of more attachment devices and provides a better range of movement with attached attachment devices. Snap-hook 10 can be made to withstand immense pressure and weight without breaking to ensure the safety of users. Snap-hook 10 can also be made to comply with applicable safety standards. The material used to fabricate snap-hook 10 can be forged or stamped heat-treated metal such as but not limited to aluminum, titanium, and alloys.

Figure 2:
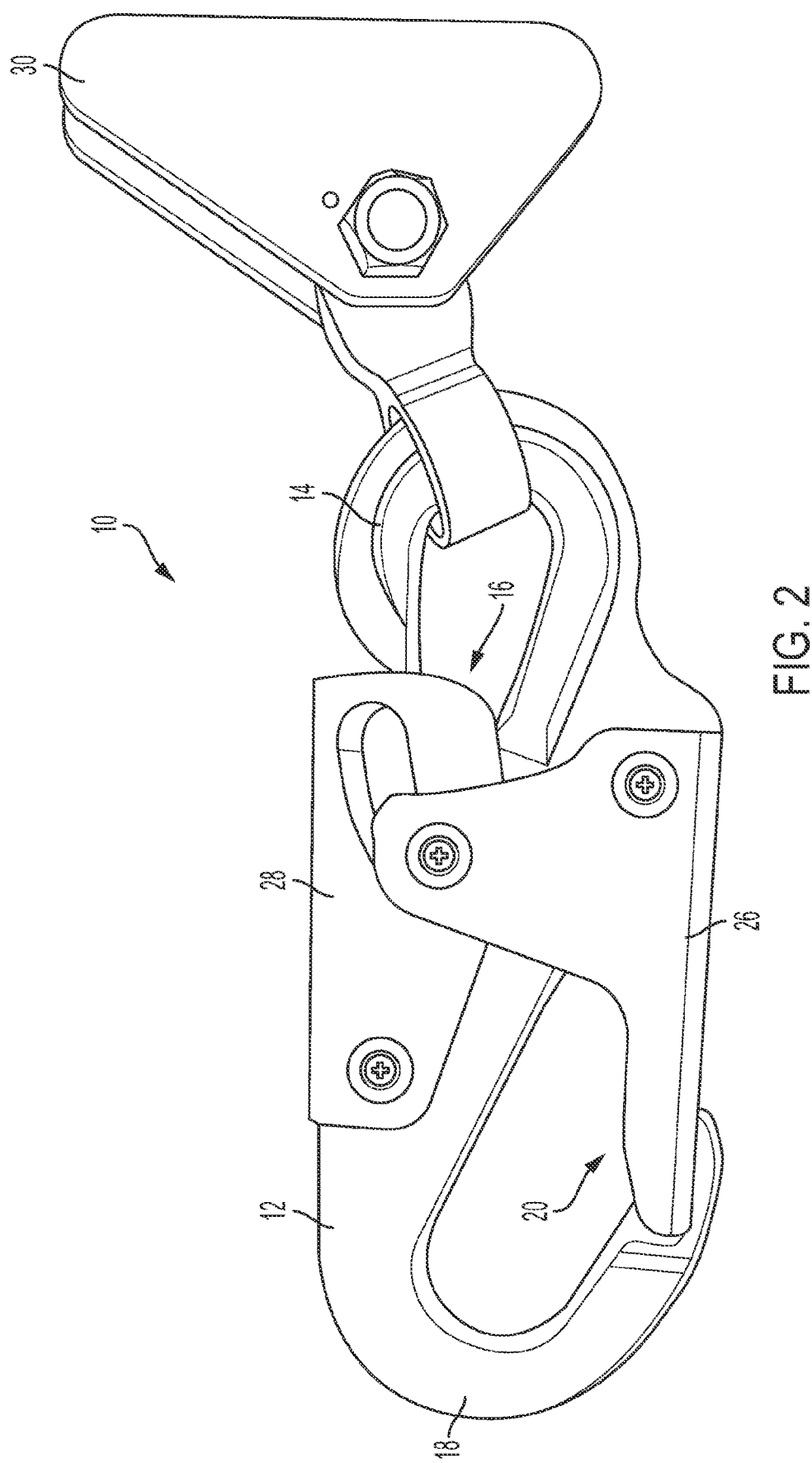
FIG. 2 is a perspective view of an example of a snap-hook with a locking mechanism.

Referring now to FIG. 2, there is shown a perspective view of an example of snap-hook 10 with a locking mechanism. In this example, there is shown a keeper 26, a locking grip member 28, and an attachment device 30. While the locking mechanism can be achieved in a variety of ways, in this example the locking mechanism is comprised of keeper 26, locking grip member 28, a fist biasing means, and a second biasing means. The biasing means can achieved with a coil spring or other suitable apparatus in the art.

Figure 3:
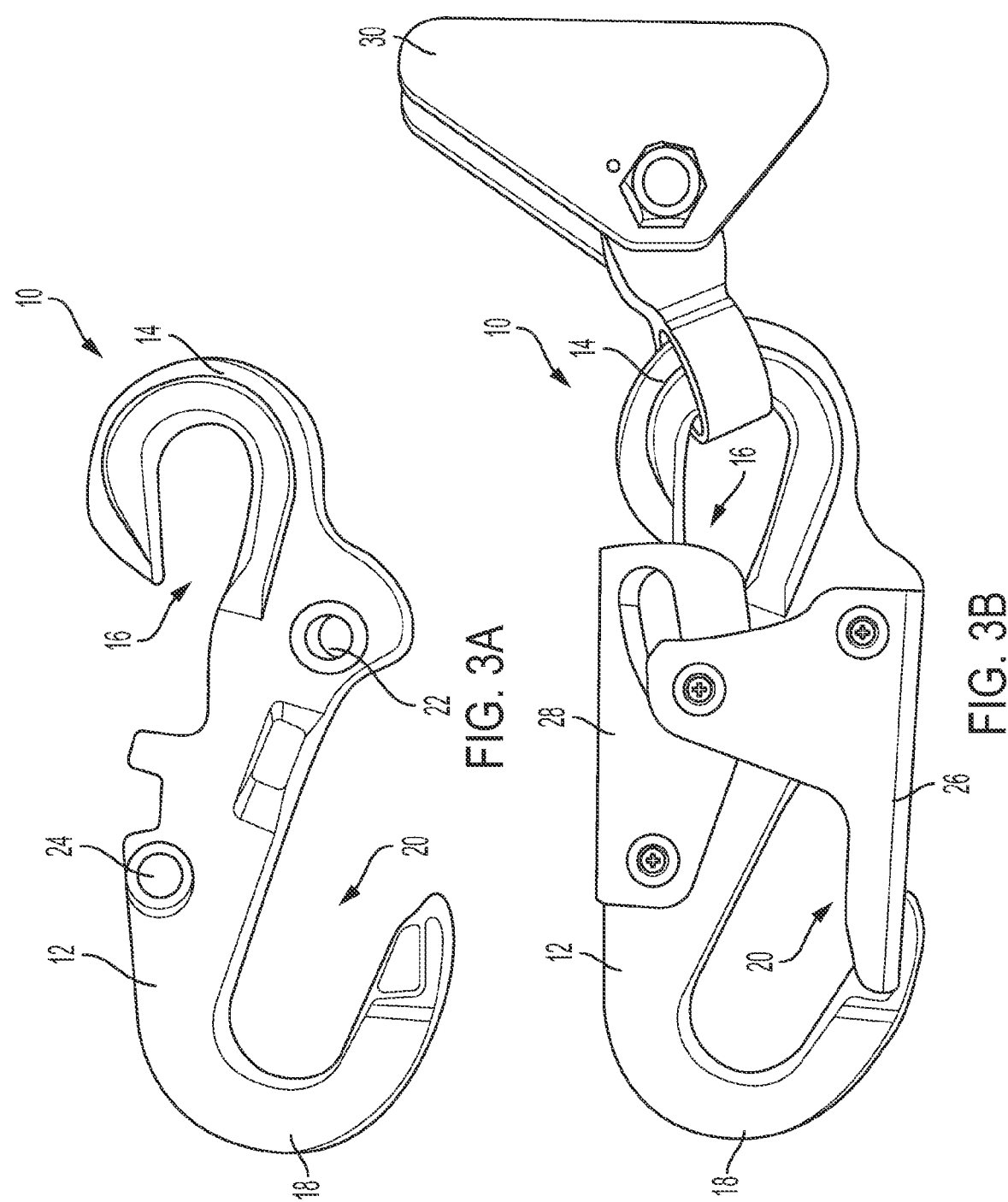
FIG. 3a is a perspective view of an example of a snap-hook absent a locking mechanism.
FIG. 3b is a perspective view of an example of a snap-hook with a locking mechanism.

Referring now to FIGS. 3a and 3b, there are shown perspective views of a snap-hook 10 absent a locking mechanism and a snap-hook 10 with a locking mechanism. Keeper 26 is pivotally attached to body member 12 via hole 22 and is movable between a first terminal position and a second terminal with respect to body member 12. The first biasing means is adapted to bias keeper 26 against pivotal movement with respect to body member 12. Locking grip member 28 is pivotally attached to body member 12 via hole 24. The second biasing means is adapted to bias locking grip member 30 against pivotal movement with respect to body member 12. Locking grip member 28 also defines a closed track. A portion of keeper 26 is in communication with the track of locking grip member 28.

Figure 4:
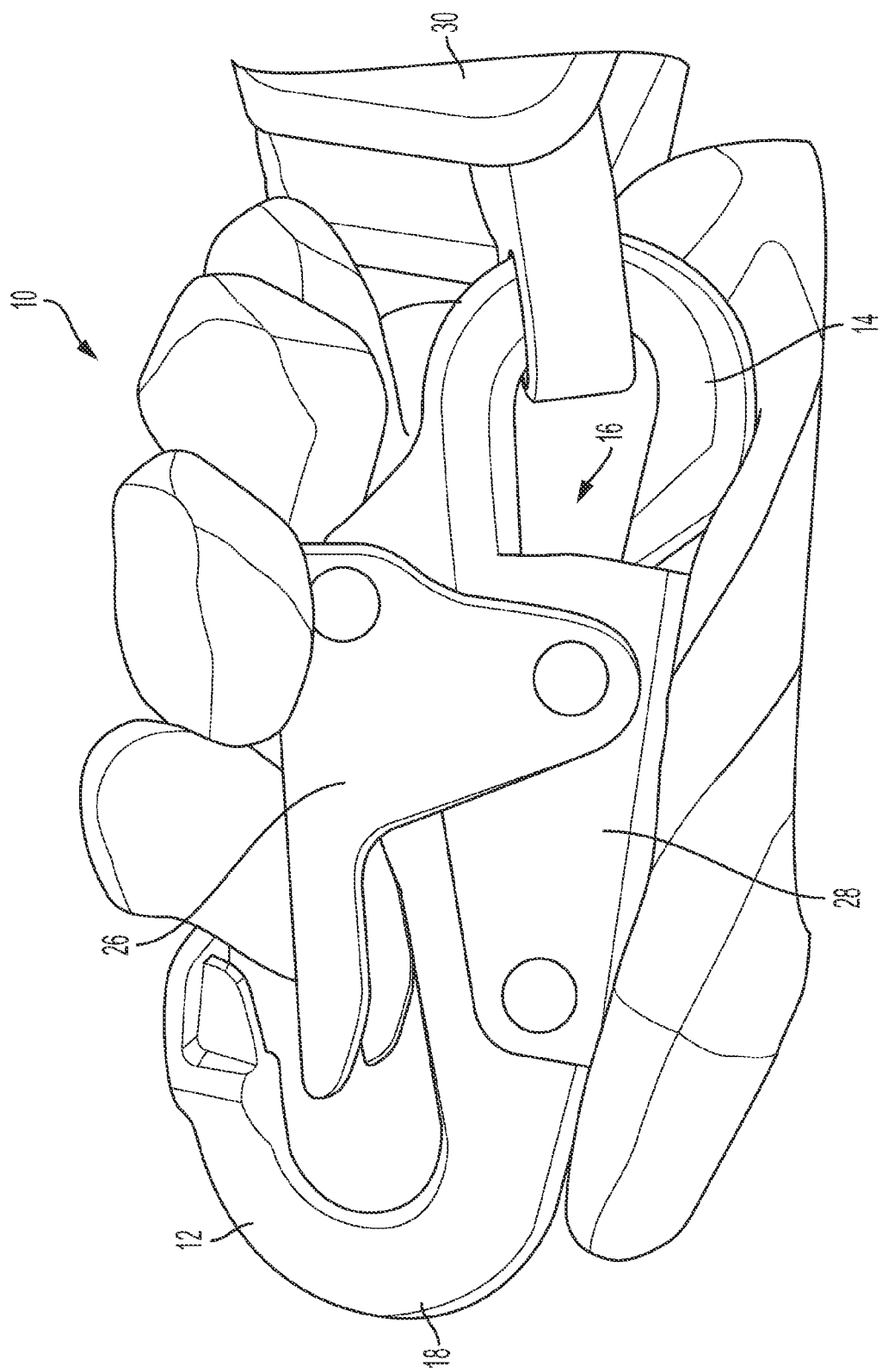
FIG. 4 is an enlarged view of an example of the proximal end of a snap-hook.
Figure 5:
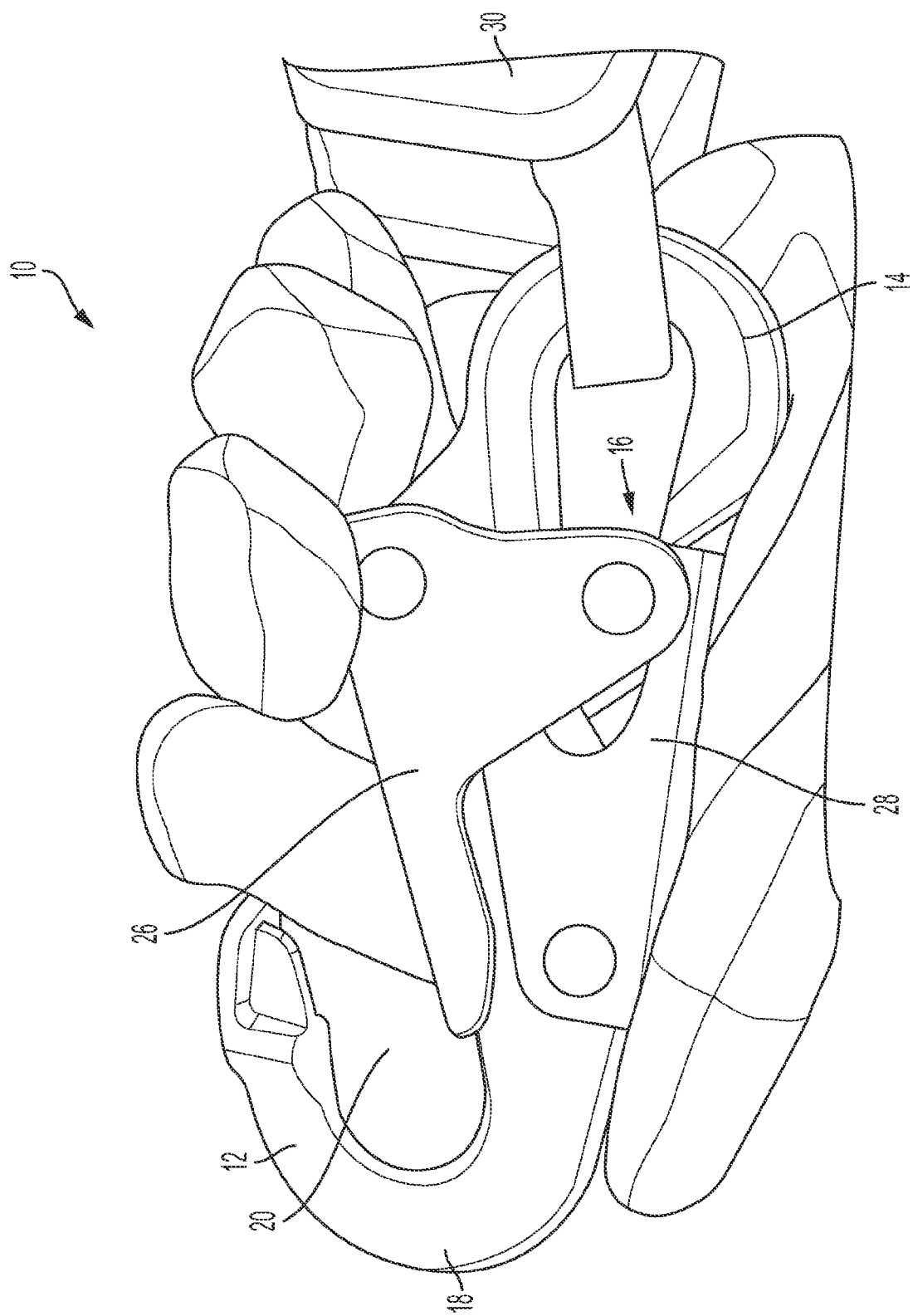
FIG. 5 is an enlarged view of an example of the proximal end of a snap-hook.

When keeper 26 is in the first terminal position, such as in FIG. 3b, keeper 26 is in blocking relation to distal opening 20 and in contact with distal hook 18. Keeper 26 can be pivoted to any position between the first terminal position and the second terminal position depending on the amount of pressure exerted upon keeper 26. Referring now to FIG. 4, keeper 26 is shown in between the first terminal position and the second terminal position in a 50% open position. Referring now to FIG. 5, keeper 26 is shown in the second terminal position and is 100% open. When in the second terminal position, keeper 26 is pivoted to have a portion of keeper 26 inside of distal opening 20. When in this position, distal opening 20 is not completly blocked by keeper 26.

Figure 6:
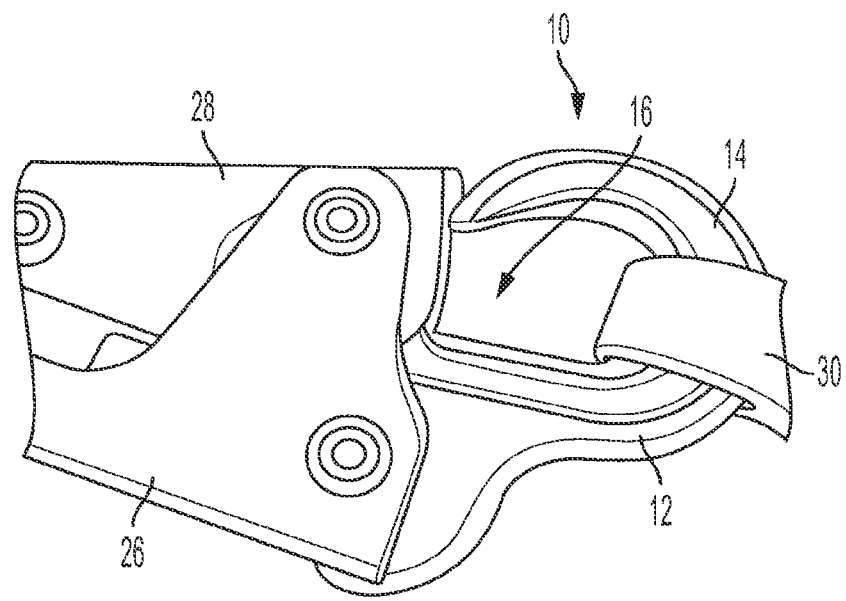
FIG. 6 is a perspective view of an example of a snap-hook with a locking mechanism.
Figure 7:
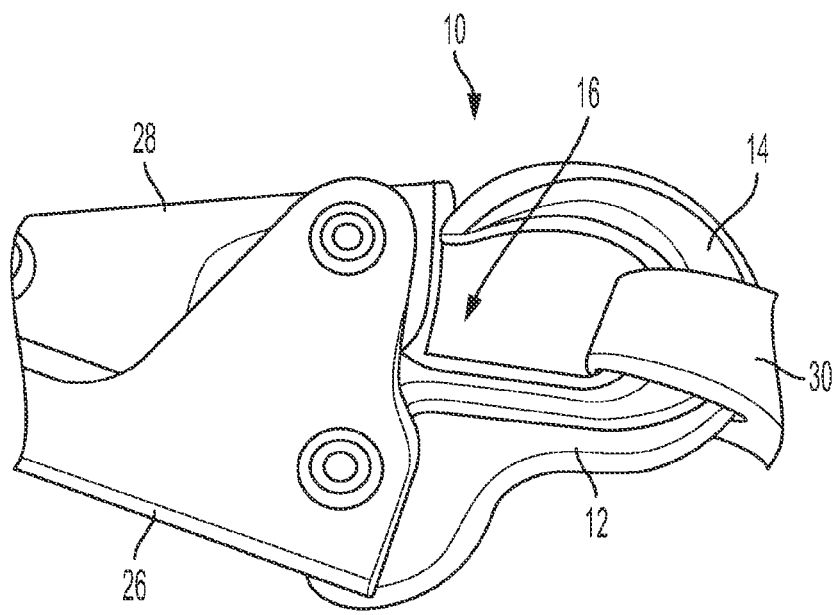
FIG. 7 is a perspective view of an example of a snap-hook with a locking mechanism.

Keeper 26 and locking grip member 28 are both depressible with respect to body member 12. Referring now to FIG. 6 and FIG. 7, there is shown enlarged views of examples of snap-hook 10. In FIG. 6, keeper 26 is in the second terminal position and is not depressed. Keeper 26 must be depressed with respect to body member 12 in order to be moveable from the first terminal position to the second terminal position. In this example, the locking mechanism is a double action lock, wherein keeper 26 cannot be depressed or pivot to the second terminal position unless locking grip member 28 is simultaneously depressed therewith. In FIG. 7, keeper 26 is in the second terminal position and is being depressed against body member 12. In this example, locking grip member 28 should be squeezed to unlock keeper 26 for actuation and movement. This can be done using a camming mechanism or other similar mechanism.

A linkless attachment device 30 can be used in conjunction with snap-hook 10. The sigmoidal configuration of body member 12 and opposing distal and proximal openings 20, 16 allow for direct connection of different attachment devices 30 without the need of an intermediate attachment link. Proximal opening 16 is dimensioned and configured such that a variety of attachment devices 30 may be passed into proximal opening 16. Therefore, attachment devices 30 do not need to be formed as an integral portion of body member 12. Consequently, a separate casting or forging is not required for body member 12. This decreases expenses as separate tooling (e.g., molds, dies, etc.) and inventories is no longer required for each variation. Attachment devices 30 can be put into proximal opening 16 and then keeper 26 and locking grip member 28 can be permanently riveted in place.

Figure 8A:
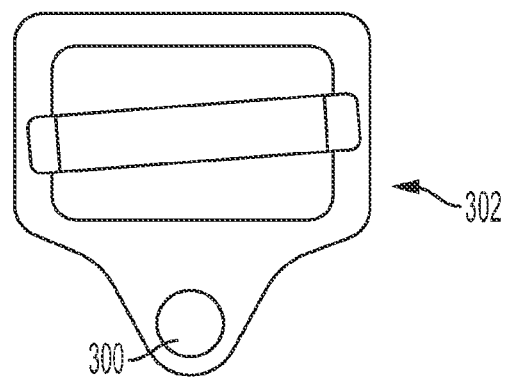
FIG. 8a is a perspective view of an example of an attachment device.
Figure 8B:
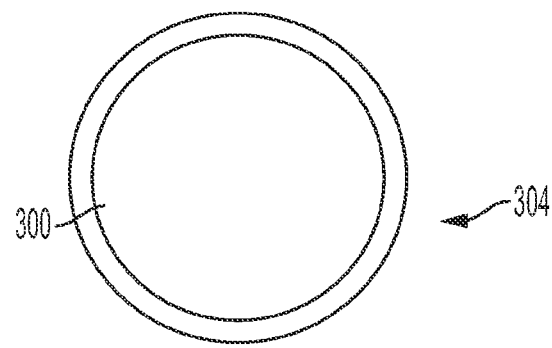
FIG. 8b is a perspective view of an example of an attachment device.
Figure 8C:
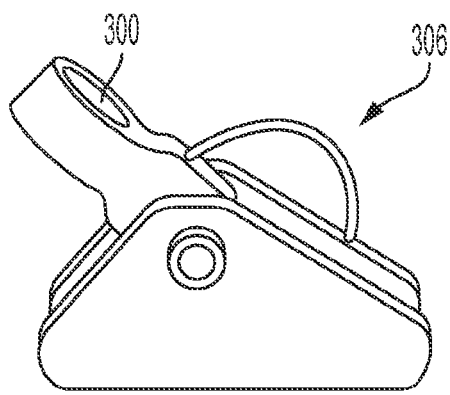
FIG. 8c is a perspective view of an example of an attachment device.

Referring now to FIGS. 8a, 8b, and 8c, there are shown perspective pictorial views of examples of attachment devices 30. Respectively, a friction buckle 302, a solid ring 304, and a rope grab 306. Each attachment device 302, 304, 306 is equipped with a ring 300 suitable for sliding through proximal opening 16 of body member 12. However, attachment devices 302, 304, 306 form no part of snap-hook 10 and are shown merely to illustrate the intended use. Further, while a friction buckle 302, a solid ring 304, and a rope grab 306 have been shown for purposes of disclosure, those of skill in the art will comprehend that numerous other attachment devices may be substituted therefor to meet a particular operating circumstance or environment.

What is claimed is:
1. 1. A linkless snap-hook, comprising:
 a body member having a first inner surface section which extends in a first plane, the body member further comprising a proximal hook, defining a proximal opening facing a first direction, and a distal hook, defining a distal opening facing a second direction;
 wherein the proximal hook comprises a portion that is spaced from and extends at least partially along the body member wherein the portion comprises a second inner surface section which extends in a second plane which faces the first inner surface and extends substantially parallel to the first inner surface, and the distal hook comprises a portion that is spaced from and extends at least partially along the body member;
 a keeper depressible to and pivotally attached to the body member and movable between a first and second terminal positions with respect to the body member;
 a first biasing means adapted to bias the keeper against pivotal movement with respect to the body member;
 a locking grip member pivotally attached to the body member and depressible with respect thereto;
 a second biasing means adapted to bias the locking grip member against pivotal movement with respect to the body member; and
 wherein the pivotal movement of the keeper is dependent on the pivotal movement of the locking grip member such that the keeper cannot be pivoted to the second terminal position unless the locking grip member is depressed toward the body member.

2. The snap-hook of claim 1, wherein the body member is sigmoidal.

3. The snap-hook of claim 1, wherein the body member further defines at least one hole.

4. The snap-hook of claim 1, wherein the proximal opening is dimensioned to accept an attachment device.

5. The snap-hook of claim 1, wherein the locking grip member defines a closed track that the keeper is in communication with.

6. The snap-hook of claim 1, wherein the keeper cannot be pivoted to the second terminal position unless the locking grip member is simultaneously depressed therewith.

\* \* \* \* \*